United States Patent [19]

Iijima et al.

[11] Patent Number: 4,799,564
[45] Date of Patent: Jan. 24, 1989

[54] ELECTRIC WHEEL DRIVE

[75] Inventors: Katsuhiko Iijima; Kazuo Itami, both of Sagamihara, Japan

[73] Assignee: Mitsubishi Jukogyo Kabushiki Kaisha, Japan

[21] Appl. No.: 7,009

[22] Filed: Jan. 27, 1987

[30] Foreign Application Priority Data

Jan. 29, 1986 [JP] Japan .................................. 61-15746
Mar. 20, 1986 [JP] Japan .................................. 61-63049
Mar. 20, 1986 [JP] Japan .................................. 61-63051
Mar. 24, 1986 [JP] Japan .................................. 61-65150

[51] Int. Cl.$^4$ ............................................. B60K 7/00
[52] U.S. Cl. ................................... 180/65.5; 180/65.6; 180/68.1; 74/801; 188/264 P; 310/63
[58] Field of Search ..................... 180/65.5, 65.6, 68.1, 180/60; 74/797, 801; 188/18 A, 264 D, 264 P; 184/6.12, 6.22, 6.28; 310/52, 63, 67 R

[56] References Cited

U.S. PATENT DOCUMENTS

| 3,035,652 | 5/1962 | McLean | 180/60 |
| 3,770,074 | 11/1973 | Sherman | 180/65.6 |
| 3,812,928 | 5/1974 | Rockwell et al. | 180/65.5 |
| 4,330,045 | 5/1982 | Myers | 180/65.5 |
| 4,389,586 | 6/1983 | Foster et al. | 310/67 R |

FOREIGN PATENT DOCUMENTS 2549913 2/1977 Fed. Rep. of Germany ..... 180/65.5

Primary Examiner—David M. Mitchell
Assistant Examiner—Brian L. Johnson
Attorney, Agent, or Firm—McGlew and Tuttle

[57] ABSTRACT

An electric wheel drive for a wheel body having a drive housing with an interior side facing toward the body and having an opposite exterior side facing away from the body includes a drive motor which has a drive shaft facing the exterior side. Second stage star-type reduction gear and a first stage planetary reduction gear are connected to the drive shaft of the drive motor and they are located adjacent the exterior side. The second stage gear has an outer driving gear surface which is in driving engagement with the wheel hubs of a tire. The construction includes a cooling air passage extending from said housing interior side past said drive motor first and then through first and second gear stages to the exterior side.

3 Claims, 16 Drawing Sheets

ELECTRIC WHEEL DRIVE

BACKGROUND OF THE INVENTION

1. Field of the Invention

The present invention relates to an electric wheel drive which is applied to, for example, a dump truck for use in a mine, a wheel loader, a scraper, a dozer, a towing tractor and the like.

2. Related Art Statement

Electric wheel drives are disclosed in U.S. Pat. Nos. 4,330,045; 3,686,978; 3,387,502 and 3,035,652.

Conventional electric wheel drives are divided into two types on the basis of the position of a reduction gear as shown in FIGS. 20 and 21. Both types employ an air-cooled motor and a dry-type brake.

More particularly, the conventional electric wheel drive includes one type in which a reduction gear is disposed at the inner side of a vehicle body with respect to a motor and a brake device which are disposed at the outer side of the body than the motor as shown in FIG. 20. The other type includes a first-stage planetary reduction gear disposed at the outer side of the body with the motor and a second-stage star-type reduction gear disposed outside of the planetary reduction gear. The first-stage planetary reduction gear of FIG. 21 is disposed inside of a hub bearing disposed outside of the wheel body.

However, such conventional electric wheel drives have problems as described below. Description is now made to the problems in detail with reference to the drawings.

Referring to FIG. 20 showing the former type drive in section, the former type includes first-stage and second-stage reduction gears 61 and 62 disposed at the inner side the vehicle body 51 relative to the motor 53, the motor 53 being disposed in an axle case 52 mounted on the body 51 and the brake device being disposed at the other side of the motor 53 near the outside H of the body 51. With such a construction type, however, it is necessary to remove tires 63 from a hub wheel case 57 and remove the axle case 52 from the body 51 upon maintenance of the reduction gears 61 and 62. Particularly, in a large-sized vehicle, much labor is required due to the weight of the tire 63 and the axle case 52. In the drive of this type, the power of the motor 53 is transmitted to the tires 63 through the first and second stage reduction gears 61 and 62. However, since the first stage reduction gear 61 is a conventional external-type gear and the second stage reduction gear is a conventional internal-type gear, it is limited in a confined space to largely reduce the high rotational power of the motor 53 and transmit the power of low speed and high torque to the tires 63. Further, cooling air for cooling the motor 53 of FIG. 20 is generally taken in from the side G of the body and is led through a gap 56 between a gear case 55 and the axle case 52 to the motor 53. Then, the cooling air passes through the brake device 54 and is exhausted outside of the axle case 52 from an outlet 58. In this case, however, since the passage of the cooling air is prevented by the gear case 55 and the cooling air takes a long way around the gear case, the cooling air suffers loss and is warmed by the gear case 55. Accordingly, it is not preferable for cooling the motor 53.

In FIG. 20, the motor 53 is disposed in the axle case 52 mounted to the body 51 and the rotary power of the motor 53 is reduced through the first and second stage reduction gears 61 and 62 and transmitted to the tires 63. Since the first stage reduction gear 61 is a conventional external type gear and the second stage reduction gear is a conventional internal type gear, it is limited in a confined space to largely reduce the rotary power of the motor 53 and transmit the power of low speed and high torque to the tires 63.

On the other hand, referring to FIG. 21 showing the latter type drive in section, the motor 73 is disposed at the innermost side of the axle case 72 mounted on the vehicle body 71. The first-stage planetary reduction gear 81 is disposed at the outer-side N of the vehicle body 71 with respect to the motor 73 and the second-stage star-type reduction gear 82 is disposed outside of the first-stage planetary reduction gear 81 so that the power of the motor 73 is transmitted to the tires 83. The brake device 74 is mounted to the outside of an external cover 75 of the axle case. In the drive of this type, cooling air for cooling the motor 73 is taken in the motor 73 from an inlet 76 and is exhausted outside of the motor 73 from an outlet 77 of the motor 73. The cooling air is then exhausted outside of the vehicle body 71 through a gap 78 between the axle case 72 and the motor 73. However, air warmed by the motor 73 passes outside of the motor 73 and hence it is not desirable with respect to cooling efficiency.

While the drive shown in FIG. 21 includes the motor 73 disposed at the innermost side of the axle case 72 mounted to the vehicle body 71, the first-stage planetary reduction gear 81 disposed at the outer-side N of the vehicle body with respect to the motor 73 and inside of the hub bearing and the second-stage star-type reduction gear 82 disposed outside of the first-stage planetary reduction gear whereby the rotary power of the motor 73 is transmitted to the tires 83. However, in this drive, the reduction ratio of the first-stage planetary reduction gear 81 is determined by a diameter of the hub bearing so that it is difficult to obtain a large reduction ratio.

SUMMARY AND OBJECTS OF THE INVENTION

Accordingly, it is a first object of the present invention to provide an electric wheel drive for use in, for example, a large vehicle having a structure in which a reduction ratio of a reduction gear is sufficiently large in accordance with the high speed of a motor, and maintenance of the reduction gear and a brake device is readily made.

Further, the present invention has been made in order to solve the above problems and a second object of the present invention is to provide an electric wheel drive in which a large reduction ratio can be attained by the combination of two reduction gears of the star type and the planetary type, maintenance containing disassembly and assembly can be easily made without removal of a tire and an axle case from a vehicle body, and cooling efficiency of the motor can be improved.

Further, there are two types of the conventional electric wheel drives. One type includes the reduction gear disposed at one side of the motor near the center of the vehicle body and a brake device disposed at the other side of the motor near the outside of the body as shown in FIG. 20, while the other type includes the first-stage planetary reduction gear disposed at the outer side of the body with respect to the motor and the second-stage star-type reduction gear disposed outside of the first-stage planetary reduction gear as shown in FIG. 21. The first-stage planetary reduction gear of FIG. 21 is disposed inside of a hub bearing disposed outside of the vehicle body.

In the drive shown in FIG. 20, the motor 53 is disposed in the axle case 52 mounted to the vehicle body 51 and the rotary power of the motor 53 is reduced through the first and second stage reduction gears 61 and 62 to be transmitted to the tires 63. The first and second stage reduction gears 61 and 62 are disposed at one side of the motor 53 near the center of the vehicle body (that is, the left hand of the motor) and the brake device 54 is disposed outside of the vehicle body (that is, the right hand of the motor). In this case, when a cooling oil pump is disposed outside of the vehicle body, the cooling oil pump can not rotate at a high speed since the drive shaft of the motor is coupled with the first and second stage reduction gears 61 and 62. Although the oil pump can rotate at a high speed if the oil pump is disposed in the axle case 52, the brake device 54 is required to be removed upon maintenance and much labor and time are required. Further, upon maintenance of the first and second stage reduction gears 61 and 62, it is necessary to remove the tires 63 from the hub wheel case 57 and to remove the axle case 52 from the vehicle body 51. A large vehicle has heavy tires 63 and axle case 52 and hence the removal of the tires and axle case is very difficult.

In the drive shown in FIG. 21, the motor 73 is disposed at the innermost side of the axle case 72 mounted to the vehicle body 71 and the first stage planetary reduction gear 81 is disposed at the outer side of the vehicle body with respect to the motor 73 but inside of the hub bearing with second stage star-type reduction gear 82 being disposed outside of the first stage planetary reduction gear 81 so that the rotary power of the motor 73 is transmitted to the tires 83. This structure also has the same problems as that of FIG. 20.

Accordingly, it is a third object of the present invention to remove the above problems and to provide an electric wheel drive suitable for a large vehicle, for example.

The drive shown in FIG. 20 includes the first and second stage reduction gears 61 and 62 which are disposed at one side of the motor near the center of the vehicle body, the motor 53 disposed in the axle case 52 mounted to the vehicle body 51 and the brake device 54 disposed outside of the vehicle body. The motor 53 is so cooled that air entered through an air cleaner not shown is led into the motor 53 from the gap 56 between the gear case 55 and the axle case 52 and is exhausted through the brake 54 from the outlet 58 to the outside.

The drive shown in FIG. 21 includes the motor 73 disposed in the innermost of the axle case mounted to the vehicle body 71 and the first and second stage reduction gears 81 and 82 which are disposed at the outer side of the vehicle body with respect to the motor 73. The motor 73 is so cooled that air entered through an air cleaner not shown is introduced from the inlet 76 of the motor 73 and is exhausted outside of the motor from the outlet 77. However, cooling air exhausted from the motor 73 is exhausted through the gap 78 between the axle case 72 and the motor 73 to the inside of the vehicle body 71 without exhaust to the outside since the reduction gear is disposed outside of the axle case 72.

In the conventional apparatuses described above, since the motor is cooled by air, if the removal of harmful material in the cleaner is not complete, the material is attached in the motor and rust is produced due to water in the air, thereby performance of the motor deteriorates. Therefore, since the conventional apparatuses have difficult structure to remove the axle case from the vehicle body, maintenance is not made easily.

In the drive shown in FIG. 20, the flow of cooling air is prevented by the gear case 55 and the cooling air necessarily takes a long way around the gear case 55. Consequently, the cooling air is warmed by the gear case 55 and it is not preferable in the cooling efficiency.

In the drive shown in FIG. 21, the exhausted air warmed by the motor 73 passes by the surface of the motor 72 again and hence it is not also preferable in the cooling efficiency.

Accordingly, it is a fourth object of the present invention to provide an electric wheel drive which is easy maintenance of the reduction gear, brake device motor and the like, and which has high cooling efficiency and is suitable for a large vehicle, for example.

In order to solve the above problems and achieve the first object, the present invention comprises the following instrumentalities. A second stage star-type final reduction gear is disposed further toward the outer side of a vehicle body with respect to a motor and a first stage planetary reduction gear is disposed outside of the first stage star-type reduction gear with both the reduction gears being disposed at the outside of the vehicle body with respect to a hub bearing so that large reduction ratio can be attained by combination of both the reduction gear.

Thus, since a gear case having a size as large as an axle case can be utilized without restriction by a bearing case, large reduction gear can be attained in proportion to the size of the gear case.

In order to achieve the second object, the electric wheel drive according to the present invention provides a second stage star-type final reduction gear and a first stage planetary reduction gear which are disposed at the outer side of a vehicle with respect to a motor in the order of description, the motor being disposed in an axle case, a brake device disposed between an outer periphery of a case of the first stage planetary reduction gear at the outermost side of the axle and an inner periphery of a wheel rim, and a cooling air passage provided in a case of the second stage star-type final reduction gear for exhausting cooling air introduced from the axle near the center side of the vehicle body into an end of the axle and exhausting the cooling air from the outer periphery of the case of the first stage planetary reduction gear.

With the above structured electric wheel drive, since the second stage star-type final reduction gear and the first stage planetary reduction gear are disposed in this order at the outside of the vehicle body with respect to the motor and the brake device is disposed between an outer periphery of the case of the first stage planetary reduction gear at the outermost side of the axle and the inner periphery of a wheel rim, design of a large reduction ratio can be attained by the combination of the second stage star-type final reduction gear and the first stage planetary reduction gear and maintenance of the motor, reduction gears and brake device can be made easily without removal of tires and the axle case from the vehicle body. Further, since the second stage star-type final reduction gear is provided with the cooling air passage which exhausts cooling air introduced from the axle near the center of the vehicle into the axle end so that the cooling air is exhausted from the outer periphery of the first stage planetary reduction gear, the cooling efficiency of the motor can be improved remarkably.

In order to achieve the third object of the present invention by solving the above problems, the present invention comprises the following instrumentalities. By combining two reduction gears of the planetary type and the star type, the output shaft of the motor can drive a reversible cooling oil pump while the pump is disposed at the outermost portion of the axle. The second stage startype final reduction gear is disposed at the outer side of the vehicle with respect to the motor, the first stage planetary reduction gear is disposed outside of the second stage star-type final reduction gear and the brake device is disposed around the first stage planetary reduction gear so that maintenance of the motor, reduction gear and brake device can be made without removal of tires and so forth.

With such a structure, the cooling oil pump can be rotated at high speed and maintenance of the motor, reduction gears and brake device is made without removal of tires and so forth.

In order to achieve the fourth object of the present invention by solving the above problems, the present invention comprises the following instrumentalities.

(1) The brake device and the reduction gear are disposed at the outer side of the vehicle with respect to the motor.

(2) The brake device employs multiple wet plates and the motor is cooled by oil. There is provided a reversible pump directly coupled with the motor and an oil pressure circuit is incorporated into the axle case.

(3) An oil cooler is provided in the axle case and introduced cooling air is adapted to directly pass through passages in the outer periphery of the motor and the outer periphery of reduction gear.

With the structure described in the item (1), maintenance can be made without removal of the axle case from the vehicle body.

With the structure of the item (2), the durability and maintenance period can be made longer.

With the structure of the item (3), the cooling efficiency can be improved.

DETAILED DESCRIPTION AND EMBODIMENTS OF THE INVENTION

Figure 1:
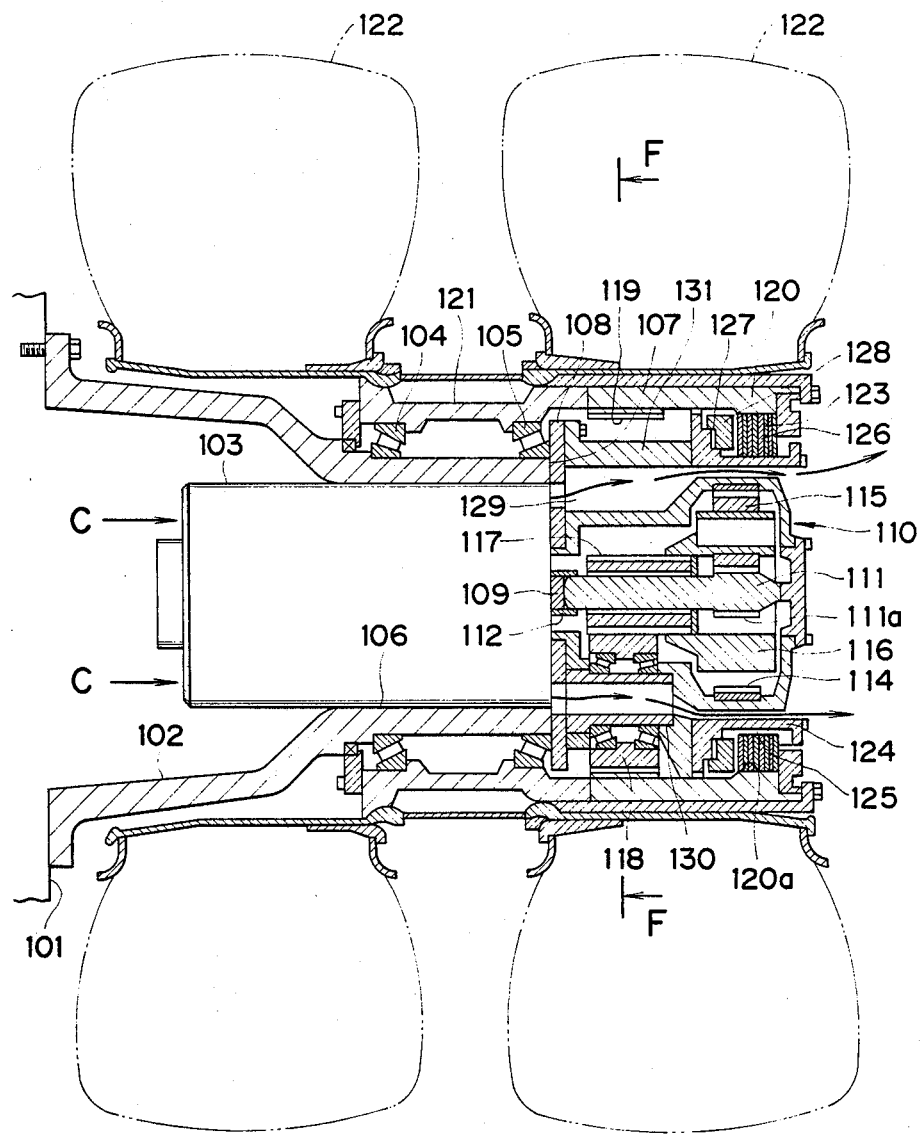
FIG. 1 is a sectional view of an electric wheel drive according to an embodiment of the present invention.
Figure 2:
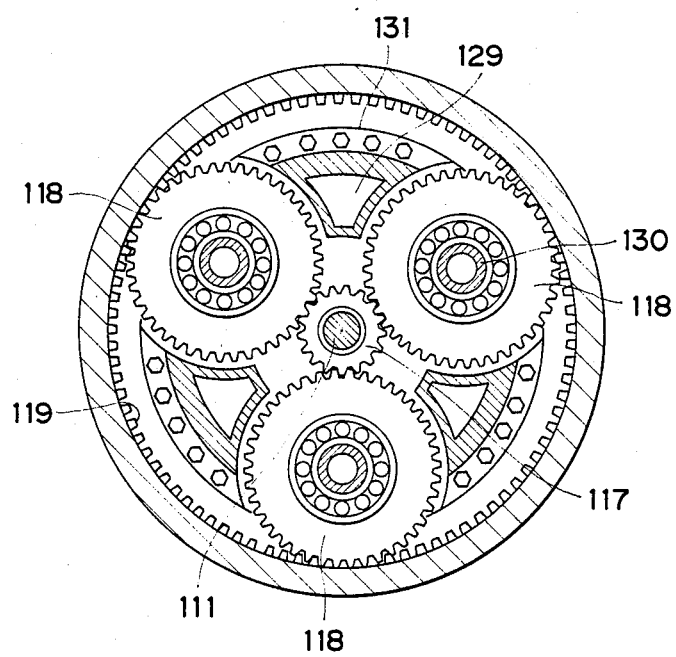
FIG. 2 is a sectional view of the drive taken along line F—F of FIG. 1.
Figure 3:
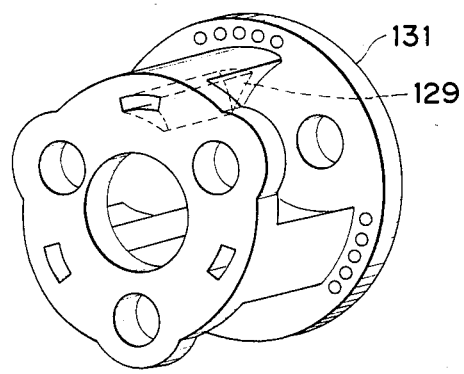
FIG. 3 is a perspective view of a gear case.
Figure 4:
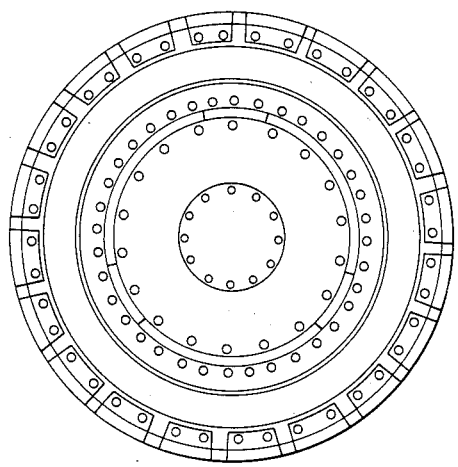
FIG. 4 is a side view.

FIGS. 1 to 4 show an embodiment of the present invention, in which FIG. 1 is a sectional view of an electric wheel drive, FIG. 2 is a sectional view taken along line F—F of FIG. 1, FIG. 3 is a perspective view of a gear case and FIG. 4 is a side view. As shown in FIG. 1, a motor 103 is disposed, in an axle case or housing 102 mounted in a vehicle body 101, concentrically a hub bearings 104 and 105 disposed at an outer periphery of the axle case 102. A flange 108 extending from the motor 103 is mounted to an inner surface 106 and an end surface 107 of the axle case 102.

An output shaft 109 of the motor 103 is coupled with a pinion shaft 111 of a first reduction gear 110 through a collar 112 having a spline at its inner peripheral surface to transmit rotary power of the motor. The output shaft 109 and the pinion shaft 111 are detachably coupled with each other by the collar 112.

Rotary power of a pinion gear 111a formed on the pinion shaft 111 is transmitted to a pinion gear 117 of a second reduction gear by means of a planetary carrier 116 through a fixed ring gear 114 and a planetary gear 115. The pinion gear 117 is formed in a hollow structure so that the pinion shaft 111 can penetrate the hollow portion.

Rotary power of the pinion gear 117 is transmitted to a ring gear 119 through an idler gear 118 mounted fixedly.

The outer periphery of the ring gear 119 is supported by a gear case 120 by means of spline engagement. Rotary power from the ring gear 119 is transmitted to tires 122 through the gear case 120 and a hub wheel case 121.

The first reduction gear 110 and the second reduction gear are disposed at the outer side of the vehicle body rather than the hub bearings 104 and 105.

A disk plate 123 is meshed with a spline 120a in the inner peripheral surface of the gear case 120 at the outside of the vehicle body. A brake fixing ring 124 is fixedly mounted to a gear case 131 mounted to the axle case 102 and a disk plate 126 is meshed with the inner peripheral surface of the brake fixing ring 124 by means of a spline 125.

When oil is enters into a chamber 127, a piston 128 moves toward the disk plate 126 so that breakage is effected by friction between the disk plates 123 and 126.

Figure 5:
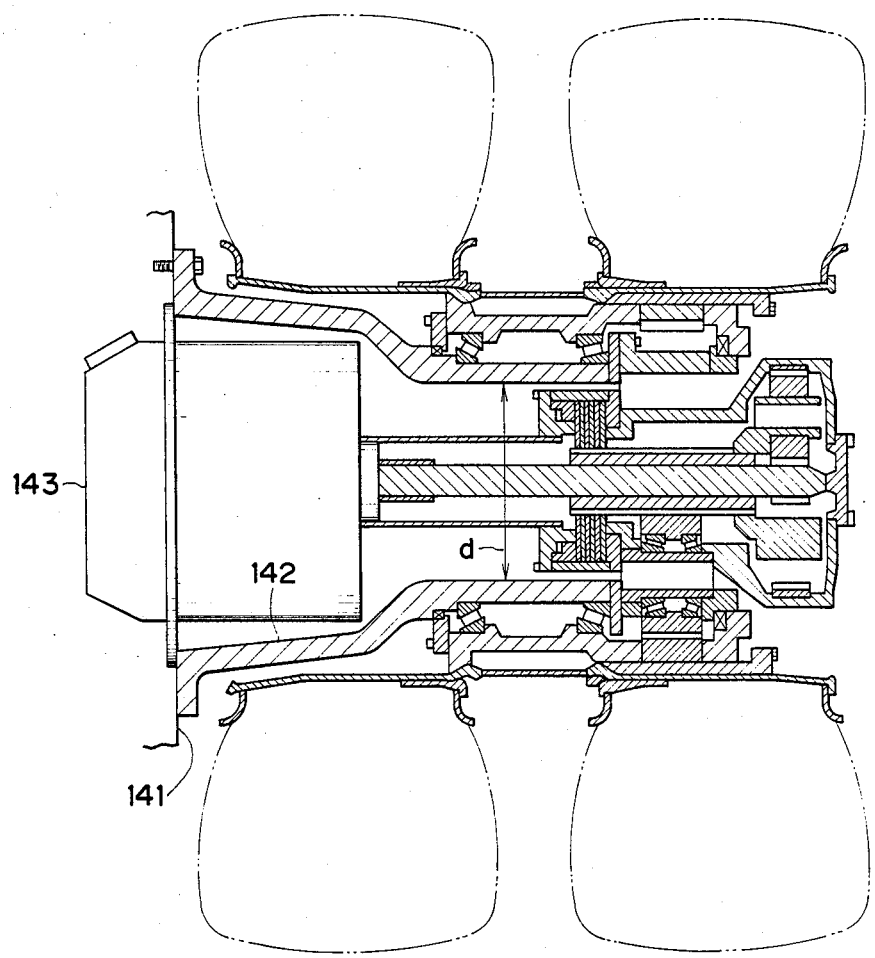
FIG. 5 is a sectional view of an electric wheel drive according to a further embodiment of the present invention.

FIG. 5 is a sectional view showing another embodiment of the present invention, in which numeral 141 denotes a vehicle body, numeral 142 denotes an axle case and numeral 143 denotes a motor. The structure of FIG. 5 can also attain the object of the present invention in the same manner as the above embodiment of FIG. 1.

According to the present invention, the following effects are attained.

(1) Since limitation due to the bearing case is removed, the planetary ring gear can be made large to the size of the axle case. Accordingly, the reduction ratio can be made large.

(2) Since the reduction ratio can be established so as to be large, the motor can be rotated at high speed with improved efficiency.

(3) When it is not required to have a large the reduction ratio, the brake device can be disposed around the first reduction gear and the brake device is not protruded outside from the axle largely.

Figure 6:
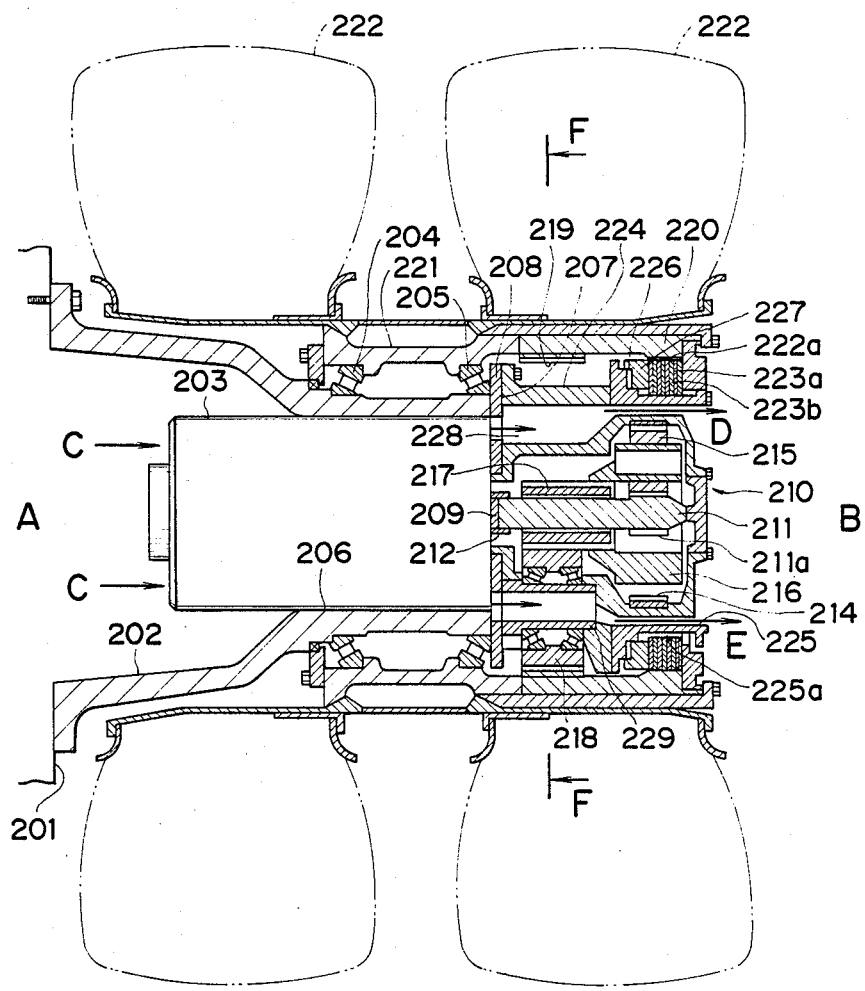
FIG. 6 is a sectional view showing another embodiment of the present invention.
Figure 7:
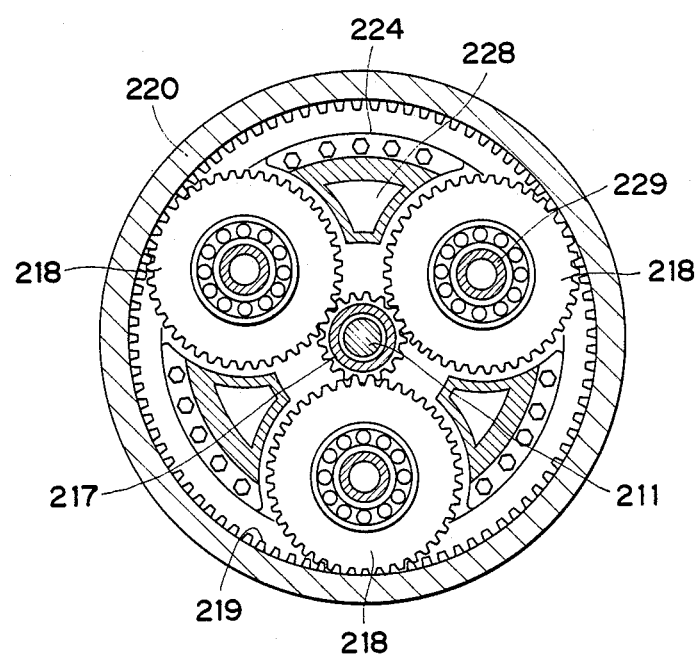
FIG. 7 is a sectional view taken along line F—F of FIG. 6.
Figure 8:
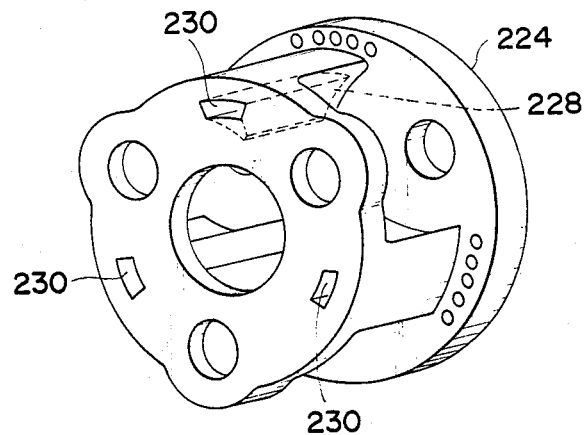
FIG. 8 is a perspective view showing a detail of a gear case of FIG. 6.
Figure 9:
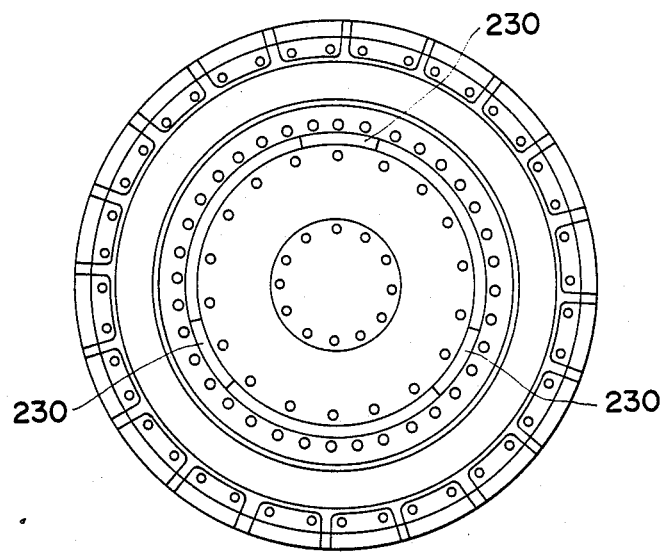
FIG. 9 is a side view of the drive as viewed from a side B of FIG. 6.

FIG. 6 is a sectional view showing an exemplary structure of the electric wheel drive according to the present invention, FIG. 7 is a sectional view taken along line F—F of FIG. 6, FIG. 8 is a perspective view showing detail of a gear case 224 of FIG. 6, and FIG. 9 is a side view as viewed from the side B of FIG. 6.

In the figures, a motor 203 is disposed, in an axle case 202 mounted to a vehicle body 201, concentrically to hub bearings 204 and 205 disposed to the outer periphery of the axle case 202 and the motor 203 is mounted to an inner peripheral surface 206 and an end surface 207 of the axle case 202 by means of a flange 208 extending from the motor 203. An output shaft 209 of the motor 203 is coupled with a pinion shaft 211 of a first stage planetary reduction gear 210 through a collar 212 having a spline at its inner peripheral surface to transmit the rotary power thereto. The output shaft 209 and the pinion shaft 211 are detachably coupled with each other by the collar 212. Rotation of a pinion gear 211a formed on the pinion shaft 211 is transmitted through a fixed ring gear 214 and a planetary gear 215 to a pinion gear 217 of a second stage star-type reduction gear by means of a planetary carrier 216. The pinion gear 217 is formed in a hollow structure so that the pinion gear shaft 211 penetrates the pinion gear 217. Rotation of the pinion gear 217 is transmitted to a ring gear 219 through a fixedly supported idler gear 218. The outer periphery of the ring gear 219 is supported by a gear case 220 by means of spline engagement and rotation of the ring gear 219 is transmitted to tires 222 through the gear case 220 and a hub wheel case 221. Further, a disk plate 223a is meshed with a spline 222a on the inner peripheral surface of the gear case 220 at the outside of the vehicle body. A brake fixing ring 225 is fixed to a gear case 224 mounted to the axle case 202 and a disk plate 223b is meshed with the outer peripheral surface of the brake fixing ring 225 by means of a spline 225a.

On the other hand, when oil is entered into a chamber 226, a piston 227 is moved toward the disk plate 223 so that brakeage is effected by friction of the disk plates 223a and 223b. Cooling air introduced from the side A of the vehicle body to the motor 203 passes in the motor 203 through a plurality of passages 228 formed in the gear case 224 as shown in FIGS. 6 to 8 and a plurality of hollow portions of the idler shafts 229 and is exhausted-outside of the axle case 202 as shown by arrows D and E. Then, cooling air shown by arrows D and E is exhausted from a plurality of outlets 230 provided in the gear case 224 as shown in FIG. 9.

As described above, the electric wheel drive according to the embodiment obtains the following various effects.

(a) Since the second stage star-type reduction gear and first stage planetary reduction gear are disposed at the outer side of the vehicle body with respect to the motor in the order of description, design of a large reduction ratio can be made by combination of these two reduction gears.

(b) Maintenance including disassembly and assembly for the motor, reduction gears and brake device incorporated into the electric wheel drive can be made easily without removal of the tires and axle case from the vehicle body. Accordingly, it is not necessary to jack up the vehicle body and efficiency of work is improved.

(c) Since the first stage planetary reduction gear is disposed at the end of the axle, the brake device can be disposed around the first stage planetary reduction gear and the brake device is largely prevented from protruding outside of the axle.

(d) Since cooling air passes from the center of the vehicle body through the axle case to the outside of the vehicle body directly, cooling loss can be reduced to an extreme degree. Further, the reduction gears and the brake device can be cooled at the same time the motor is cooled.

The present invention is not limited to the above embodiment, and it can be implemented even if it is structured as follows.

Figure 10:
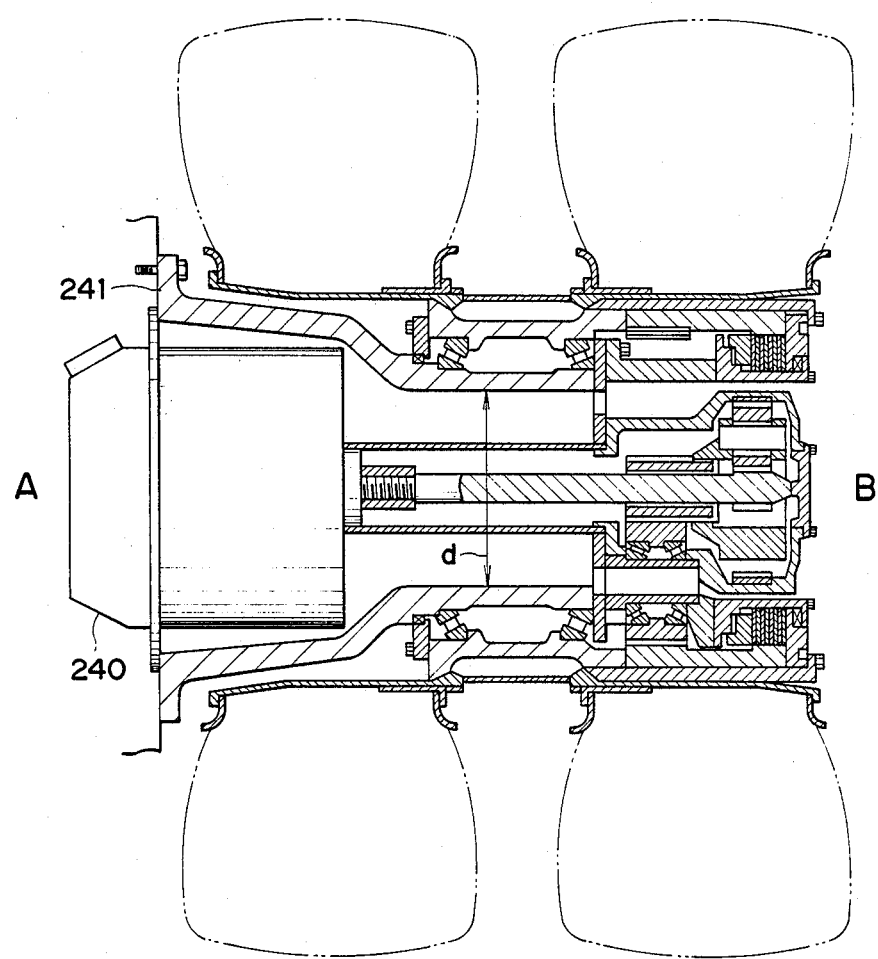
FIG. 10 is a sectional view of a further embodiment of the present invention.

For example, as shown in FIG. 10, since a motor 240 having a larger diameter than the inner diameter d of the axle case 241 is disposed at the center side A of the vehicle body, disassembly and assembly from the outside B of the vehicle body can be limited only to the reduction gear and brake device.

The electric wheel drive according to the present invention can be applied to a wheel loader, scraper, doser and towing tractor in the same manner.

Further, various modifications of the present invention can be made without departing from the gist thereof.

As described above, according to the present invention, there can be provided the electric wheel drive with high reliability in which a large reduction ratio can be obtained by combination of the two reduction gears of the star and planetary types, maintenance including disassembly and assembly of the motor, reduction gear and brake device can be easily made without removal of the tires and axle case from the vehicle body, and cooling efficiency of the motor can be improved.

Figure 11:
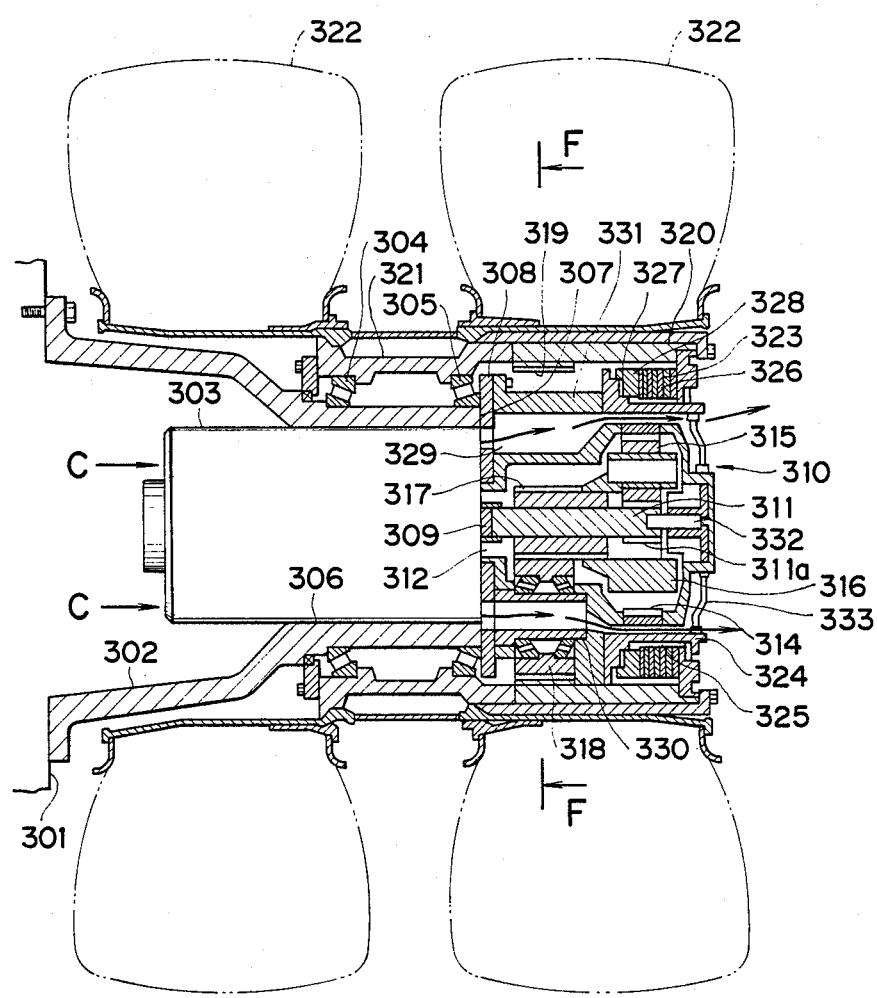
FIG. 11 is a sectional view of an electric wheel drive according to still another embodiment of the present invention.
Figure 12A:
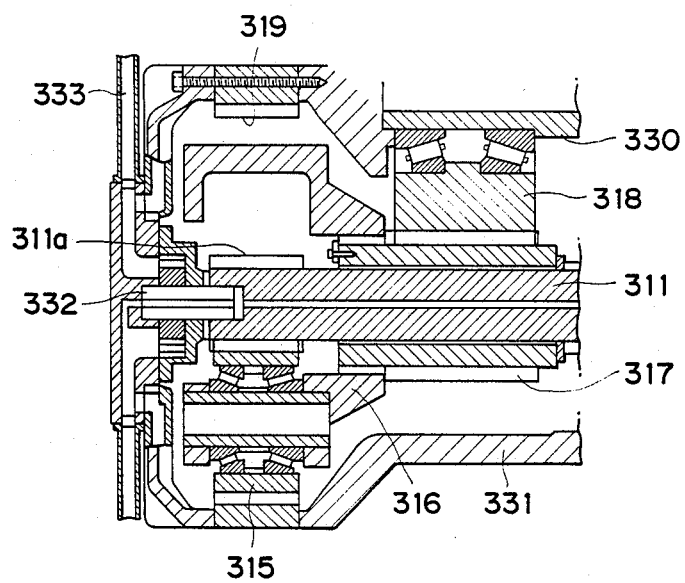
FIGS. 12(a) and (b) are sectional views taken along line F—F of FIG. 11.
Figure 12B:
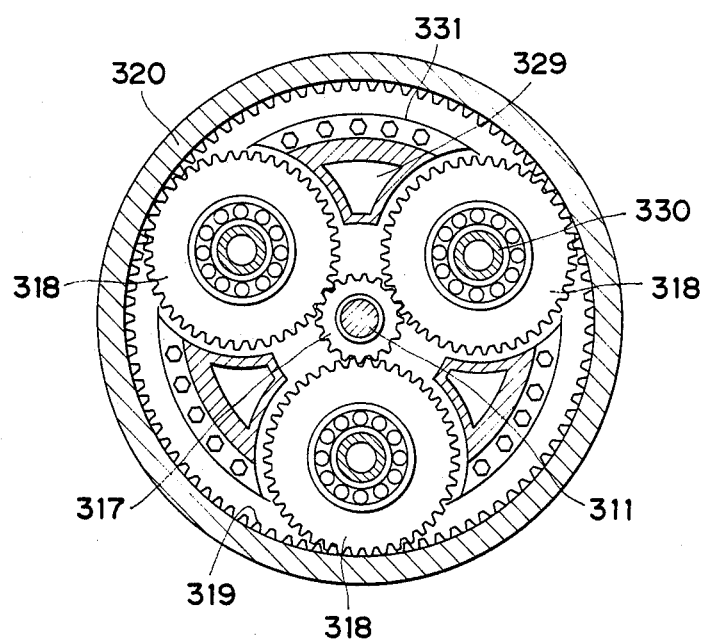
Figure 13:
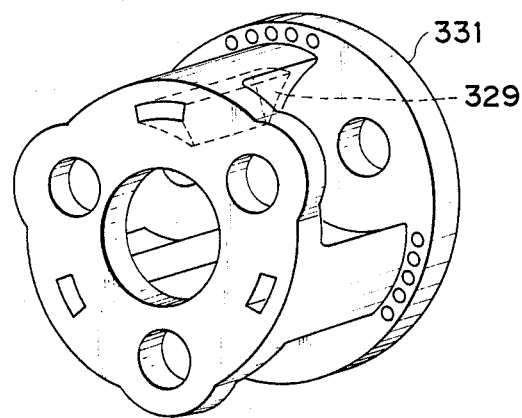
FIG. 13 is a perspective view of a gear case.
Figure 14:
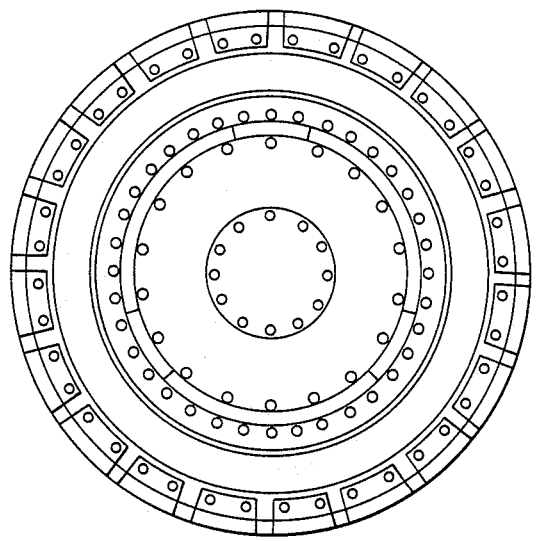
FIG. 14 is a side view.

FIGS. 11 to 14 show another embodiment of the present invention, in which FIG. 11 is a sectional view of the electric wheel drive, FIGS. 12(a) and (b) is partial sectional views of FIG. 11, FIG. 13 is a perspective view of a gear case, and FIG. 14 is a side view. As shown in FIG. 11, a motor 303 is disposed, in an axle case 302 mounted to a vehicle body 301, concentrically to hub bearings 304 and 305 disposed at the outer periphery of the axle case 302. A flange 308, extending from the motor 303, is mounted to the inner peripheral surface 306 and an end surface 307 of the axle case 302.

An output shaft 309 of the motor 303 is coupled with a pinion shaft 311 of a first reduction gear 310 through a collar 312 having a spline at its inner peripheral surface to transmit rotary power. The output shaft 309 and the pinion shaft 311 are detachably coupled with each other by means of the collar 312.

Rotation of a pinion gear 311a formed on the pinion shaft 311 is transmitted through a fixing ring gear 314 and a planetary gear 315 to a pinion gear 317 of a second reduction gear by means of a planetary carrier 316. The pinion gear 317 is formed in a hollow structure so that the pinion shaft 311 can penetrate the pinion gear 317.

Rotation of the pinion gear 317 is transmitted to a ring gear 319 through a fixedly supported idler gear 318.

The outer periphery of the ring gear 319 is supported by a gear case 320 by spline engagement. Rotation of the ring gear 319 is transmitted to tires 322 through the gear case 320 and a hub wheel case 321.

A disk plate 323 is meshed with a spline formed on the inner peripheral surface of the gear case 320 inclining toward the inside of the vehicle body. A brake fixing ring 324 is fixed to a gear case 331 mounted to the axle case 302 and a disk plate 326 is meshed with the outer peripheral surface of the brake fixing ring 324 by means of a spline 325.

When oil is entered into a chamber 327, a piston 328 is operated toward the disk plate 326 so that breakage is effected by friction between the disk plates 323 and 326. Thus, rotary power from the motor 303 is transmitted through the pinion shaft 311 to an oil pump 332 directly. Oil from the oil pump 332 cools the disk plates 323 and 326 through a pipe 333.

Figure 15:
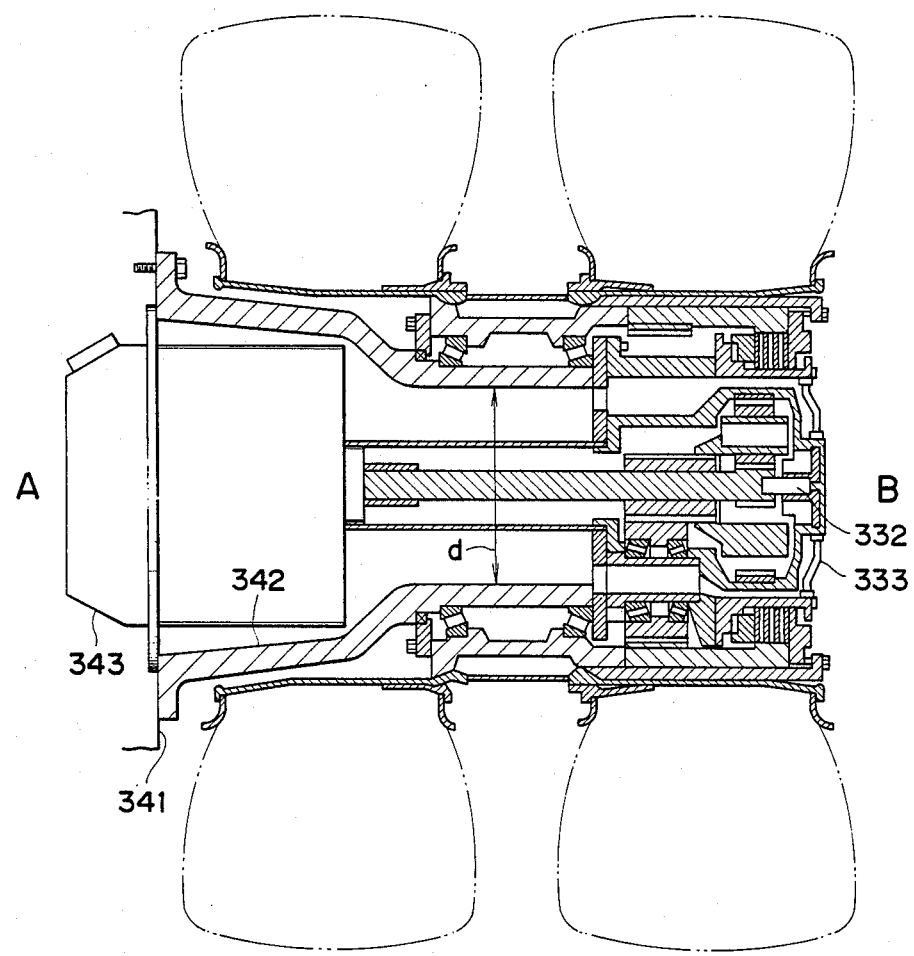
FIG. 15 is a sectional view of an electric wheel drive according to a further embodiment of the present invention.

FIG. 15 is a sectional view showing another embodiment of the present invention, in which numeral 332 denotes the oil pump, 333 the pipe, 341 vehicle body, 342 axle case and 343 motor. Such a structure can also attain the object of the present invention in the same manner as the above embodiment.

The present invention attains the following effects.

(1) The oil pump used for cooling the brake in the apparatus is disposed in the outermost portion of the axle where maintenance is easily made and the pump can be driven by the output shaft of the motor. Accordingly, high speed rotation is obtained and a sufficient amount of oil is sent out for the pump.

(2) Since the motor, reduction gears and brake device incorporated into the apparatus can be disassembled and assembled without removal of tires, it is not required to jack up the vehicle body, for example, and work for maintenance is easy.

(3) Since the oil pump is disposed in the outermost side of the axle case, the capacity and type of the pump are easily changed.

FIGS. 16 to 19 show another embodiment of the present invention. A motor 403 is disposed in an axle case 402 mounted to a vehicle body 401. A stator 404 of the motor 403 is fixed by a flange 405 and an end cover 406, and the outer periphery of the motor is hermetically sealed by a plate 407. A rotor 408 is fixedly mounted on a hollow output shaft 409. An oil pump 410 and a drive boss 411 are mounted to the output shaft 409 inclining toward the side of the vehicle body, and a sun gear 413 of a first stage reduction gear 412 is engaged with the output shaft 409 inclining toward the reduction gear using a spline. The sun gear 413 is formed with a through hole and is provided with a spline for driving an oil pump 414 at the outer end of the sun gear with a pump shaft 415 being engaged with the spline. Rotary power transmitted to the sun gear 413 is transmitted to a planetary gear 416, while since a ring gear 417 method with the planetary gear 416 is fixed to a gear case 418, a carrier 419 is rotated to transmit rotary power to a sun gear 421 of a second stage reduction gear 420. The sun gear 421 is formed with a hollow portion, and a shaft portion of the sun gear 413 of the first stage reduction gear 412 penetrates the hollow portion. Rotary power of the sun gear 421 is transmitted to a ring gear 423 through a counter gear 422. The ring gear 423 is engaged with a hub wheel case 424 using a spline to transmit rotary power. The hub wheel case 424 rotates about the axle case 402 through hub bearings 425 and 426 engaged with the axle case 422 to drive a tire 428 through a rim 427. An outer case 429 is fixed to the hub wheel case 424 by bolts. A spline is provided at the inside of the outer case 429 and is engaged with a brake disk 430. A stationary plate 431 is engaged with a spline provided outside of an inner case 432 so that the plate 431 and the brake disk 430 are disposed in the peripheral direction alternately. A piston 433, a release piston 434 and a spring 435 are disposed between the outer case 429 and the inner case 432 and are fixed by a housing 436 and a cover 437.

When pressurized oil is fed to a chamber m, the piston 433 presses the brake disk to the stationary plate 431 so that brake is effected by friction between the brake disk and the plate. When pressurized oil is fed to a chamber n, the release piston 434 changes to a free condition against the spring 435 by separating the piston 433 from the brake disk 430 and the stationary plate 431 by means of a pin engaged with the piston 433. Further, when pressurized oil is not fed to both the chambers m and n, the piston 433 presses the brake disk 430 to the stationary plate 431 by means of the spring 435 to effect breakage.

The oil pump 414 is composed of an inner rotor 438, an outer rotor 439 and a housing 440 which are fixedly mounted to the pump shaft 415, and is fixed to the body by means of a plate 441 by providing an oil path.

The oil pump 410 is fixed to the end cover 406 in the same structure as the oil pump 414. The oil pump 410 is provided with a piping 442 from the reduction gear and the motor at a suction side and a piping 444 to an oil cooler 443 at a delivery side.

The oil cooler 443 is fixed to an inlet plate 445 and is provided with a piping 446 coupled with the reduction gear case. The inlet plate 445 is coupled with a duct 447 for leading cooling air from a blower not shown. A seal 448 is provided at both sides of the reduction gear. Reference letter a represents a gap at the outer periphery of the motor 403, b represents a penetrating path provided in the gear case 418, and c represents an outlet for cooling air.

Figure 16:
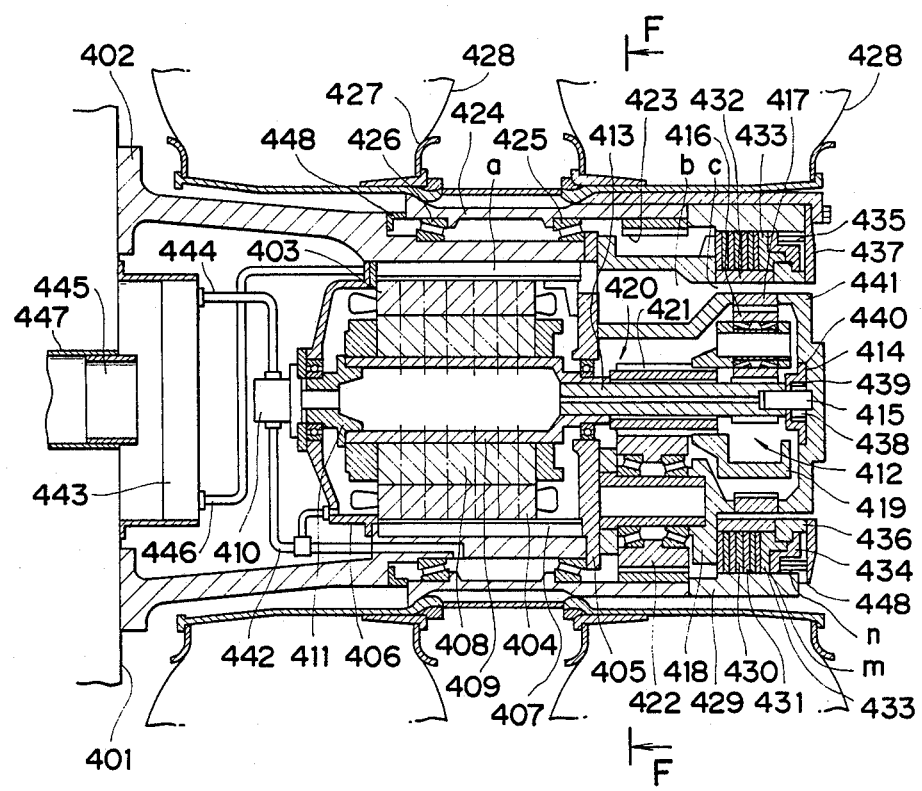
FIG. 16 is a sectional view of an electric wheel drive according to a still further embodiment of the present invention.
Figure 17:
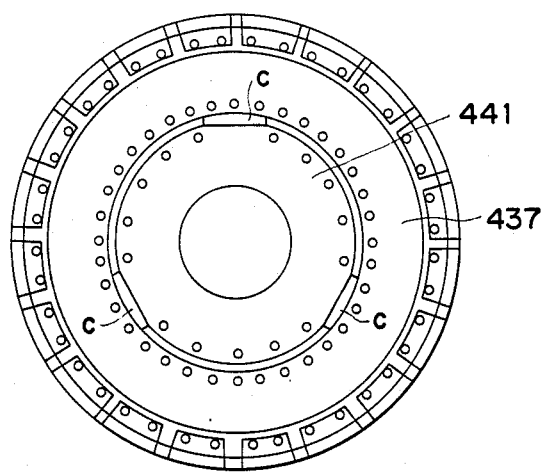
FIG. 17 is a right-hand sectional view of FIG. 16.
Figure 18:
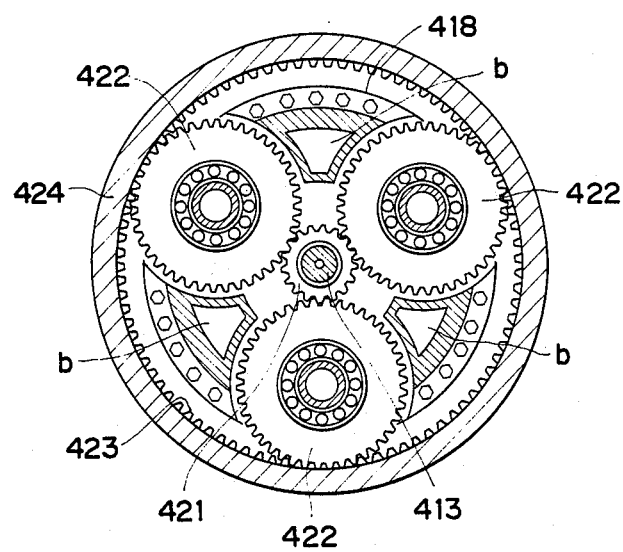
FIG. 18 is a partial sectional view of FIG. 16.

FIG. 17 is a right-hand side view of FIG. 16 and FIG. 18 is a sectional view taken along line F—F of FIG. 16. There is shown three penetrating paths b and three outlets c in the gear case 418.

Figure 19:
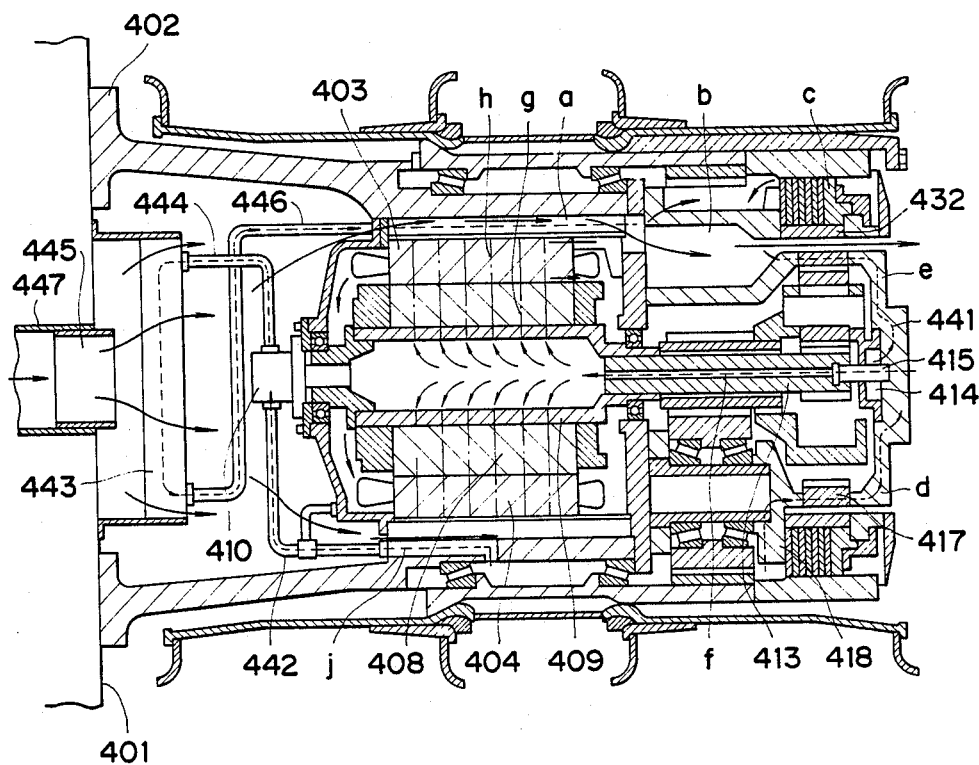
FIG. 19 shows flow of cooling oil and cooling air.
Figure 20:
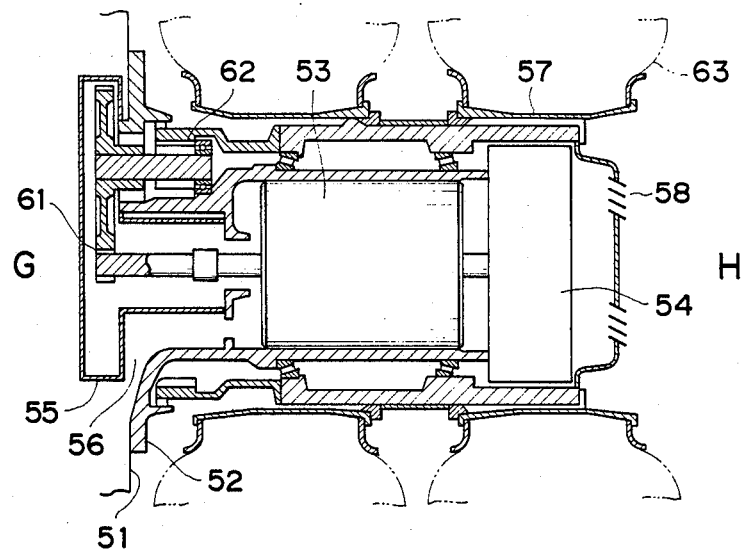
FIGS. 20 and 21 are sectional views showing prior art.
Figure 21:
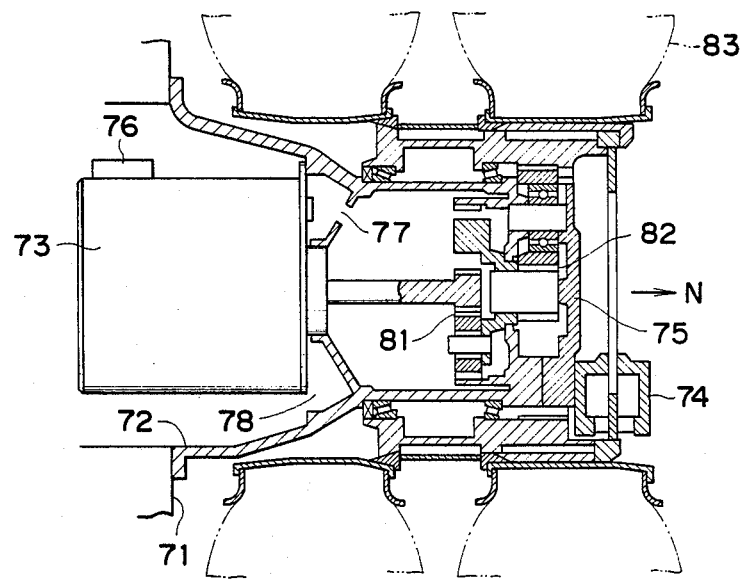

FIG. 19 shows flow of cooling oil and cooling air.

Description is first made to flow of cooling oil. The oil pump 414 sucks oil at the bottom of the reduction gear through an oil path d provided in the gear case 418, the ring gear 417 and the plate 441. Part of the sucked oil is fed to the disk brake through an oil path e provided in the plate 441, the ring gear 417, the gear case 418 and the inner case 432 for cooling and lubrication. Further, part of the sucked oil is fed to the hollow portion in the output shaft 409 of the motor 403 through an oil path f in the pump shaft 415 and the sun gear 413. The oil is exhausted outside of the rotor through a penetrating path g provided in the output shaft 409 and the rotor 408 in the circumferential direction by the centrifugal force by rotation of the rotor 408. The exhausted oil passes between the stator 404 and the rotor 408 to fall down from both sides, or part of the exhausted oil passes through a penetrating hole h provided in the stator 404 and falls down from the outer periphery of the stator through both sides. The motor 403 is cooled in this course.

The oil pump 410 sucks oil at the bottom of the reduction gear through the piping 442 from an oil path provided at a lower portion of the axle case 402. At this time, oil collected in the bottom of the motor 403 is also sucked. The sucked oil is fed through the piping 444 to the oil cooler 443. The oil is cooled by cooling air in the cooler 443 and returned to the reduction gear by piping 446.

Description is now made to flow of cooling air. Cooling air is introduced from the duct 447 and the inlet plate 445, and is exhausted through the oil cooler 443, the gap a around the outer peripheral of the motor 403 and the penetrating path b of the gear case 418 to the outside from the outlet c. Since the blower is driven by an engine while the blower and engine both not shown, the pump is stopped when the motor 403 is stopped (when the vehicle body is stopped), while since cooling air flows, remaining heat just after stop can be cooled by cooling air.

The present invention is not limited to the embodiments and various modifications of the present invention can be implemented without departing from the gist of the present invention.

The present invention possesses the following effects.

(1) Since the brake device and the reduction gear are disposed outside of the axle case, maintenance can be made without removal of the axle case from the body.

(2) Since the motor is directly coupled with the cooling oil pump to cool the motor and the brake device by oil, influence of the external environment (air containing harmful material such as iron and salt) is not effected. The pump does not require other power sources and since the pump is stopped when the vehicle body is stopped, energy loss is minimized.

(3) The oil cooler is provided in the axle case and the cooling air thereof passes around the outer periphery of the motor and through the penetrating path in the reduction gear and accordingly cooling structure can be made compact. Further, remaining heat can be cooled by cooling air when the vehicle body is stopped.

Thus, there is provided the electric wheel drive which has easy maintenance of the reduction gear, the brake device and the motor and high cooling efficiency and is suitable for a large vehicle, for example.

What is claimed is:

1. An electric wheel drive, comprising a drive housing having an interior side facing the wheeled body and an opposite exterior side facing away from the wheeled body, a drive motor in said drive housing having a drive shaft facing said exterior side, a second stage star-type reduction gear and a first stage planetary reduction gear connected to said drive shaft and located adjacent said exterior side, a hub surrounding said drive housing, bearing means rotatably supporting said hub located adjacent said motor closer to said interior side than said first and second stages, and a pressure-oil pump for lubrication directly mounted to a sun gear of said planetary reduction gear coupled to said drive shaft.

2. An electric wheel drive, comprising a drive housing having an interior side facing the wheeled body and an opposite exterior side facing away from the wheeled body, a drive motor in said drive housing having a drive shaft facing said exterior side, a second stage star-type reduction gear and a first stage planetary reduction gear located adjacent said exterior side and connected to said drive shaft, a hub surrounding said drive housing, bearing means rotatably supporting said hub located adjacent said motor closer to said interior side than said first and second stages, an oil path coupled with an oil cooler, the oil path passing through a disk brake and passing through the motor and a reversible pressure-oil pump driven by said motor connected to said oil path to circulate oil through said path to effect oil-cooling.

3. An electric wheel drive according to claim 2, wherein each of said first stage and second stage reduction gear includes an outer periphery adjacent said exterior side and said motor includes an outer periphery spaced from an inner wall of the drive housing said oil-cooler being disposed behind a cooling air inlet of the drive housing, means defining a path for penetrating cooling air to pass through said oil cooler, said path extending so as to be linearly disposed between said outer peripheries of the associated reduction gears and the outer periphery of the motor and said inner wall of the drive housing so that the cooling air is exhausted from said drive housing.

* * * * *